Patented Apr. 7, 1942

2,278,415

UNITED STATES PATENT OFFICE 2,278,415

INTERPOLYMERS OF UNSYMMETRICAL DICHLOROETHYLENE

Harold W. Arnold, Wilmington, Del., assignor to E. I. du Pont de Nemours & Company, Wilmington, Del., a corporation of Delaware No Drawing. Application July 19, 1938, Serial No. 220,010

7 Claims. (Cl. 260—84)

This invention relates to interpolymers of asymmetrical dichloroethylene and, more particularly, to interpolymers of asymmetrical dichloroethylene and polymerizable, completely organic compounds containing a methylene ($CH_2$) group attached by an ethylenic double bond to a carbon atom which is in turn attached to a negative group, said negative group containing a carbon atom joined to a second and preferably dissimilar atom by more than one bond, this latter multi-bonded carbon atom being separated from the carbon atom to which the ethylenic double bond is attached, by not more than one chain atom.

Heretofore synthetic resins have been prepared by interpolymerizing asymmetrical dichloroethylene with various polymerizable, completely organic compounds as defined above. While unmodified, polymerized asymmetrical dichloroethylene is an inferior resin for most purposes, being very insoluble and decomposing badly to give dark colored, weak, and brittle articles when it is molded, the prior art workers did learn that, by interpolymerizing this compound with various polymerizable, completely organic compounds as defined above, a greatly improved resin could be obtained. However, it had always been proposed to interpolymerize asymmetrical dichloroethylene with a single compound, and the resulting interpolymers did not possess a full range of useful properties. Where an interpolymer having one favorable property, i. e., a relatively high softening point, was obtained, it would invariably be deficient in some other property such as strength or toughness. None of these interpolymers had the whole range of properties of a plastic adapted for wide commercial use.

An object of the present invention is to provide new modified asymmetrical dichloroethylene interpolymers. A further object is to provide such interpolymers having properties which adapt them for greater utility in the synthetic resin field. A more specific object is to provide such interpolymers having satisfactory strength, toughness, stability, and molding characteristics. Other objects of the invention will be apparent from the description given hereinafter.

The above objects are accomplished according to the present invention by interpolymerizing asymmetrical dichloroethylene with at least two polymerizable, completely organic compounds containing a methylene ($CH_2$) group attached by an ethylenic double bond to a carbon atom which is in turn attached to a negative group, said negative group containing a carbon atom joined to a second and preferably dissimilar atom by more than one bond, this latter multi-bonded carbon atom being separated from the carbon atom to which the ethylenic double bond is attached, by not more than one chain atom.

More specifically, the present invention comprises interpolymerizing asymmetrical dichloroethylene with at least one of that class of polymerizable, completely organic compounds as defined above which, when polymerized alone, will produce soft rubbery polymers, and at least one of that class of polymerizable, completely organic compounds as defined above which, when polymerized alone, will produce hard, brittle polymers of high softening point. The selection of the components other than the asymmetrical dichloroethylene and the relative amounts of each used will depend upon the properties desired in the interpolymer to be made. Preferably the preparation of the interpolymers is accomplished by polymerizing the components in aqueous emulsions under pressure in the presence of an oxygen-yielding catalyst.

The following examples, wherein proportions are given in parts by weight, illustrate specific embodiments of the invention:

*Example I.*—A mixture of 30 parts of asymmetrical dichloroethylene, 15 parts of methyl alpha-methacrylate, and 5 parts of vinyl acetate was emulsified by vigorous agitation in a mixture consisting of 4 parts of a 50% solution of the sodium salt of acetoxyoctadecane sulfate, 1.0 part of 30% hydrogen peroxide, 0.1 part of concentrated hydrochloric acid, and 75 parts of water. The resulting emulsion was heated with occasional agitation for 66 hours at 50° C. in a closed vessel capable of withstanding the pressure developed. The emulsion was filtered through broadcloth, diluted with two volumes of distilled water, and the whole heated to 60° C. It was then rapidly stirred and 20 parts of a 10% solution of aluminum sulfate were added. The product, which precipitated as a fine white powder, was filtered off, washed several times with warm water, and agitated with a warm solution of 0.5% sodium hydroxide for several hours. It was then filtered, again washed with water until the washings were neutral to litmus, and finally washed with methanol to facilitate drying. Forty-two (42) parts of a fine powder were obtained. On molding a portion of this product at 120° C., a clear, practically colorless article softening at 77° C. was produced. Analysis showed the polymer to contain 59.2% asymmetrical dichloroethylene.

By way of comparison, a mixture of 60 parts of methyl methacrylate and 40 parts of asymmetrical dichloroethylene was emulsified by shaking vigorously in a closed vessel with a mixture of 8 parts of a 50% aqueous solution of the sodium salt of acetoxyoctadecane sulfate, 150 parts of water, 2 parts of 30% hydrogen peroxide, and 0.2 part of concentrated hydrochloric acid. The resulting emulsion was heated at 55° C. with occasional agitation for 48 hours. In this way, there were obtained 92 parts of white powder which, on molding at 130° C., was formed into a clear, hard, brittle article which softened at 101° C. when heated in a mineral oil bath. Analysis showed this product to contain 38% asymmetrical dichloroethylene. The molding obtained was far more brittle and had much less strength than articles molded from the three component interpolymer first described.

Again, a mixture of 80 parts of asymmetrical dichloroethylene and 20 parts of vinyl acetate was emulsified and polymerized as above. After 40 hours heating at 50° C., the emulsion was steam distilled to remove excess monomers and the polymerization product isolated and purified as above. Eighty-two (82) parts of a finely divided white powder were obtained. On molding a portion of this product at 110° C., a transparent, dark colored, weak article softening at 92° C. was produced. This molding was greatly inferior in practically every property to articles molded from the three component interpolymer first described. Analysis showed that this two component interpolymer contained 82% asymmetrical dichloroethylene.

*Example II.*—A mixture of 30 parts of asymmetrical dichloroethylene, 12 parts of styrene and 8 parts of methyl vinyl ketone was emulsified and polymerized and the product isolated as in Example I. After 112 hours heating at 50° C., 10 parts of polymer were obtained as a granular powder. On molding a portion of this at 110° C., a light-colored, clear, tough article was produced. This softened at 82° C. when heated in a mineral oil bath.

*Example III.*—A mixture of 30 parts of asymmetrical dichloroethylene, 12 parts of methyl methacrylate, and 8 parts of methyl acrylate was emulsified and polymerized and the product isolated as in Example I. After 76 hours heating at 50° C., 43 parts of polymer were obtained as a flocculent white powder. On molding a portion of this at 110° C., a perfectly clear, light-colored, strong, and tough article was produced. This softened at 60° C. when heated in a mineral oil bath. Analysis showed the polymer to contain 56% asymmetrical dichloroethylene.

*Example IV.*—Example I was repeated using a mixture of 30 parts of asymmetrical dichloroethylene, 12 parts of methyl methacrylate, and 8 parts of methacrylonitrile. After 92 hours heating at 50° C., the emulsion had a specific graviy of 1.130 at 20° C., and by coagulating the emulsion there was obtained 37 parts of a white granular product which on molding at 110° C. produced a clear, light-colored, tough article whose softening temperature was 70° C. Analysis showed the product to contain 55.4% dichloroethylene.

*Example V.*—Example I was repeated using a mixture of 30 parts of asymmetrical dichloroethylene, 10 parts of styrene, and 10 parts of methacrylonitrile. After 47 hours heating at 50° C., there were obtained 8 parts of product as a granular polymer. This molded to a clear, tough article which softened at 60° C.

*Example VI.*—Example I was duplicated using vinyl propionate in place of vinyl acetate. After 47 hours heating at 50° C., there were obtained 32 parts of product in the form of a fine white powder. On molding a portion of this at 110° C., a clear, very light-colored, strong and tough article was produced. The softening temperature was 67° C.

*Example VII.*—Example I was repeated using acrylonitrile in place of vinyl acetate. After 96 hours heating at 50° C., 16 parts of product were obtained in the form of a white granular powder. This, on molding, produced a light-colored, tough article which softened at 88° C. when heated in a mineral oil bath.

*Example VIII.*—Example I was duplicated substituting vinyl chloroacetate in place of vinyl acetate. After 96 hours heating at 50° C., the emulsion was coagulated and the product washed as in Example I. Fifty parts of product were obtained as a fine white powder. When molded at 110° C. this produced a transparent, amber-colored, tough article. Analysis showed the product to contain 61% asymmetrical dichloroethylene and 17% vinyl chloroacetate.

*Example IX.*—Example I was repeated, substituting isobutyl methacrylate in place of vinyl acetate. After 64 hours heating at 50° C., the emulsion had a specific gravity of 1.135 at 20° C. Coagulation gave 47 parts of product in the form of a granular white powder. A portion of this was molded at 110° C. to a clear, light-colored, tough article which softened at 60° C. Analysis showed the product to contain 57% asymmetrical dichloroethylene.

*Example X.*—A mixture of 65 parts of asymmetrical dichloroethylene, 30 parts of methyl methacrylate, 15 parts of vinyl acetate, and 1 part of 50% lauryl peroxide was placed in a pressure-tight glass container and heated at 45–50° C. for 66 hours. At the end of this time the product had set to a clear, light yellow, somewhat elastic mass. This was dissolved in dioxan and the product precipitated in flocculent form by the addition of a 50–50 water-methanol mixture. After drying there remained 77 parts of polymer which on molding at 130° C. produced a clear, light-colored, tough object. A film flowed from the dioxan solution was clear, colorless, and flexible after a long period of aging.

*Example XI.*—A mixture of 342 parts of asymmetrical dichloroethylene, 174 parts of methyl methacrylate, 78 parts of methyl acrylate, and 6 parts of methacrylic acid was emulsified by vigorous agitation in a solution made up of 900 parts of water, 6 parts of 30% hydrogen peroxide, 0.5 part concentrated hydrochloric acid, and 48 parts of 50% acetoxyoctadecane sodium sulfate. The resulting emulsion was placed in a pressure-tight container and heated at 35–50° C. for 88 hours with frequent agitation. The emulsion was then filtered through broadcloth and diluted with an equal volume of hot water. The emulsion was coagulated by the addition of a small volume of 10% aluminum sulfate solution. The product precipitated in the form of small lumps which were washed as in Example I. After drying there remained 290 parts of white powder. A portion of this material when molded at 130° C. produced a clear, light-colored, fairly tough object which softened at 77° C.

*Example XII.*—A mixture of 30 parts of asymmetrical dichloroethylene, 15 parts of methyl methacrylate, 5 parts of vinyl acetate, and 0.7 part of 22% acetyl benzoyl peroxide was dissolved in 50 parts of methanol. To this solution was added 2 g. of urea and sufficient water to produce a faint permanent cloudiness. The mixture was then placed in a pressure-tight glass container and heated at 42° C. for 120 hours. At the end of this time the product had separated out at the bottom of the container as an elastic gel. The supernatant liquid was poured off and the polymer dried in vacuo. There remained 23 parts of product which when broken up and molded formed a clear, tough object.

Example XIII.—A mixture of 60 parts of asymmetrical dichloroethylene, 30 parts of methyl methacrylate, and 10 parts of vinyl acetate was emulsified by vigorous agitation with a solution made up from 150 parts of water, 1.0 part of 30% hydrogen peroxide, 6 parts of 50% acetoxyoctadecane sodium sulfate, 0.2 part of concentrated hydrochloric acid, and 2 parts of urea. The resulting emulsion was allowed to stand with occasional agitation at 28-30° C. for 120 hours and was then heated at 42° C. for 40 hours. After coagulating the emulsion and washing the product as in Example I, there were obtained 91 parts of a white powder. When a portion of this was molded at 130° C. a clear, light amber, tough object was formed. The viscosity of a 15% solution of the product in dioxan was 5.9 poises.

Example XIV.—A mixture of 20 parts of asymmetrical dichloroethylene, 60 parts of methyl methacrylate, and 20 parts of styrene was emulsified, polymerized, and the product isolated as in Example I. After 47 hours at 50° C., about 27 parts of polymer were obtained as a flocculent white powder. On molding a portion of this at 130° C., a clear, almost colorless, hard object softening at 115° C. was produced.

It will be understood that the above examples are merely illustrative and that the invention broadly comprises interpolymerizing asymmetrical dichloroethylene with two or more polymerizable, completely organic compounds as heretofore described.

While the invention in its broader concept is not limited to the selection of polymerizable, completely organic compounds having, when polymerized alone, contrasting properties, it finds its most advantageous practical application in the interpolymerization with the asymmetrical dichloroethylene of at least one polymerizable compound which gives, per se, the relatively high softening point, hard, brittle type of polymer, and at least one polymerizable compound which gives, per se, the relatively soft, rubbery type of polymer. These two types of polymers are widely different in their physical characteristics and are considered by the art as being quite distinct from each other.

Among the compounds giving polymers of the first type above mentioned are: Methyl methacrylate, ethyl methacrylate, phenyl methacrylate, cyclohexyl methacrylate, p-cyclohexylphenyl methacrylate, styrene, acrylonitrile, methacrylonitrile, methacrylic acid, methacrylic amide, phenyl vinyl ketone, and methacrylic anilide. Compounds giving polymers of the second type include: Vinyl acetate, vinyl propionate, vinyl butyrate, vinyl chloroacetate, methyl acrylate, ethyl acrylate, butyl methacrylate, octyl methacrylate, n-dodecyl methacrylate, and methyl vinyl ketone.

In the preferred form of the invention asymmetrical dichloroethylene is polymerized with methyl methacrylate or styrene or both and one of the following polymerizable compounds: Methyl vinyl ketone, methacrylonitrile, vinyl esters of lower aliphatic acids and the higher openchain aliphatic monohydric alcohol esters of alpha-methylene aliphatic monocarboxylic acids.

The initial proportions of the various components used in preparing the interpolymers may be varied within wide limits as will be apparent to those skilled in the art. While polymeric products can be prepared from proportions outside such ranges, the amount of dichloroethylene will generally be from 10 to 90%, and preferably from 20 to 80%; that of the polymerizable compound which alone forms the hard and brittle type of polymer, will vary from 5 to 50%, and preferably from 10 to 40%; and that of the polymerizable compound which alone forms the soft rubbery type of polymer, will vary from 5 to 30%, and preferably from 10 to 25%. The proportions of each should, of course, be so selected as to total 100%. These proportions represent percentages by weight of the total initial amount of the ingredients.

It is preferred to conduct the interpolymerizations in aqueous emulsions. These emulsions may be prepared by agitating the mixture of monomeric materials with water to which has been added any of the well-known emulsifying and/or dispersing agents such as (1) alkali metal, ammonium, and amine salts of fatty acids, for example, sodium, potassium, or ammonium palmitate, Marseilles soap, mono-, di-, and triethanolamine salts of lauric or palmitic acids, (2) salts of true sulfonic acids as alkyl naphthalene sulfonic acids, (3) salts of sulfuric acid half esters of long chain compounds, as acetoxyoctadecane sodium sulfate, (4) monoamides of dibasic acids, (5) alkylated starches, as methylated starch, and (6) partially saponified polyvinyl acetate.

In applying the emulsion method it is advisable that the liquid be intermittently or continuously agitated as by stirring, tumbling, or shaking. This is particularly necessary when dispersing agents, such as alkylated starches or partially saponified polyvinyl acetate, are used.

Since the polymerization of asymmetrical dichloroethylene is rather slow in neutral or alkaline media and the products obtained are less stable than those produced in acid media, it is preferable to add to the emulsions before polymerization sufficient acid reacting substances, as formic, acetic, boric, or hydrochloric acids, or acid salts or mixtures thereof with buffer salts, to adjust the pH to between 1.5 and 5, and preferably between about 2.5 and about 3.5.

After polymerization the products may be separated from the dispersing agent by coagulation with inorganic, non-oxidizing acids such as sulfuric, phosphoric, or hydrochloric acid; with inorganic salts such as sodium chloride, magnesium sulfate, and especially aluminum salts; or with water-soluble monohydric alcohols. The polymerization products may also be separated by cooling the emulsions below 0° C. or by cataphoresis. After the polymer has been separated from the emulsifying liquid, it is preferably washed with a warm dilute (0.1-2.0%) aqueous solution of caustic soda to facilitate the removal of occluded dispersing or precipitating agent. It is finally washed with warm water until the washings are neutral or nearly so, and dried. To facilitate drying the polymer may be washed with lower aliphatic alcohols as methanol or ethanol.

The interpolymers of the present invention may also be prepared by polymerization of the monomeric components in bulk without added diluent in a vessel having any desired form to obtain a clear, vitreous cast product. The interpolymer formed may, if desired, be dissolved in appropriate solvents such as aromatic hydrocarbons, chlorinated hydrocarbons, ketones, esters, or dioxan, and precipitated in finely divided form by the addition of appropriate non-solvents such as water, lower aliphatic alcohols, or aliphatic hydrocarbons.

The interpolymerization may also be conducted in the presence of the above mentioned solvents as diluents or in the presence of diluents such as water-alcohol mixtures, alcohols, and aliphatic hydrocarbons in which only the monomers are soluble. By the use of liquids as solvents for polymer clear, viscous solutions are obtained from which the interpolymers may be precipitated in finely divided form by the addition of non-solvents while, by the use of liquids which are solvents only for the monomer, the interpolymer precipitates as it is produced in forms varying from hard, vitreous masses, to fluffy, finely-divided white powders, depending upon conditions.

In all instances the polymerization may be accelerated by heating the material to be polymerized from about 30° C. to about 100° C., by exposure to ultra-violet light, or by the addition of polymerization catalysts such as ozone, hydrogen peroxide, inorganic perborates or persulfates, acetyl benzoyl peroxide, benzoyl peroxide, perphthalic acid, peracetic acid, dibutyryl peroxide, lauryl peroxide, succinyl peroxide, or the like. The catalyst concentration is usually kept within a range of about 0.01% to about 2%, by weight, of the mass being polymerized, and, preferably, a concentration of 0.1% to 1.0% is used. Also, the temperature is preferably maintained between 35° C. and 50° C. The use of low temperatures together with relatively low catalyst concentration is conducive to the formation of interpolymers having better properties than those produced at higher temperatures and with higher catalyst concentrations. In some instances an advantage is obtained where asymmetrical dichloroethylene is being interpolymerized with other monomeric materials having a substantially faster polymerization rate, by adding the monomeric component or components having the faster polymerization rate in portions to the polymerizing dichloroethylene, the additions being made at such a rate as to keep the concentration of the rapidly polymerizing component or components substantially constant.

Where temperatures above 30° C. are employed, the polymerization should be conducted in closed pressure vessels to prevent the escape of dichloroethylene which boils at about 34° C. under atmospheric pressure.

Those skilled in the art will understand that the time required for substantially complete polymerization depends to a great extent on the conditions present and will vary from a few hours under some conditions to several days under others.

The interpolymers hereinbefore described are useful for the preparation of plastics, coatings, fibers, films, and adhesives, as for safety glass interlayers. Films may be prepared both by casting from solution and by hot pressing. For any of these purposes the interpolymers may be combined with or prepared in the presence of plasticizers, stabilizers, fillers, pigments, dyes, softeners, natural resins, or other synthetic resins. Specific surfaces to which coating and impregnating compositions containing these interpolymers may be applied include wood, textiles, leather, metals, glass, paper, stone, brick, concrete, plaster, and the like.

As just indicated, it may often be desirable to add stabilizers to these interpolymers to protect them from the deteriorative action of heat and light which is often observed with halogen-containing polymers. Suitable specific stabilizers include the following: epichlorhydrin, 1-phenoxy-2,3-epoxypropane, 1-p-tolyloxy-2,3-epoxypropane, alpha, alpha-dimethylglycide and ethyl glycidate; cadmium, copper, lead, and manganese salts of oleic, linoleic, stearic, ricinoleic, palmitic, lauric, and fatty oil acids generally; eugenol, butyl salicylate, and guiacol (light stabilizers); glycine, leucine, alanine, and the n-octyl ester of C-dimethylglycine; and 4-cyclohexylmorpholine. In general, monocarboxylic acid amides, preferably of the secondary or N-mono-substituted type, having heavy hydrocarbon residues, preferably in the form of long open chains, may be used advantageously as stabilizers. Specific compounds of this type include: N-(2-methyl-3-hydroxypropyl) amide of 10-undecenoic acid, N-isobutylamide of naphthenic acids, N-isobutyllauramide, N-allylamide of 10-undecenoic acid, N-(p-ethoxyphenyl) amide of 10-undecenoic acid, amides of castor oil acids, N-isobutylamide of 10-undecenoic acid, N-isobutylamides of coconut oil acids, N-isobutylamide of oleic acid, and the mixture of N-alkylamides of carbamic acid in which the alkyl groups correspond in size and proportion to those present in the higher alcohols obtained by catalytic hydrogenation of carbon oxides.

The present invention affords a novel and practical means of improving the properties of asymmetrical dichloroethylene polymers. Ordinarily, unmodified polymeric asymmetrical dichloroethylene is very insoluble and decomposes badly when attempts are made to mold it, producing very dark-colored, weak, and brittle articles. Certain interpolymers of asymmetrical dichloroethylene with one other polymerizable unsaturated organic compound show some improvement over unmodified asymmetrical dichloroethylene polymers in such properties as stability, moldability, solubility, and strength, but the improvement in properties shown by these interpolymers is limited and it is not until two components other than asymmetrical dichloroethylene are introduced that a full range of useful property variations can be obtained.

To illustrate the usefulness of the invention the following example is cited: An interpolymer of about 60% asymmetrical dichloroethylene and 40% methyl methacrylate prepared by the most effective known method is readily moldable, quite stable, and has a relatively high softening point. It is, however, quite weak and brittle. Again, an interpolymer of about 90% asymmetrical dichloroethylene and about 10% vinyl acetate has poor solubility, poor stability, low softening point, and poor strength. On the other hand, by the combination of about 60% asymmetrical dichloroethylene, about 30% methyl methacrylate, and about 10% vinyl acetate, an interpolymer is obtained which has good molding properties, good solubility, good stability, and excellent strength and toughness.

To illustrate further the advantages of the present invention, interpolymers of asymmetrical dichloroethylene with 50% or less methyl methacrylate in general have relatively high softening points and good solubility but they are rather weak and brittle. Interpolymers of asymmetrical dichloroethylene with 30% or less vinyl acetate are somewhat tougher than the corresponding dichloroethylenemethyl methacrylate interpolymers, but their softening points are quite low, and their stabiliy to light and heat are poor, and they also possess poor solubility characteristics. But by the interpolymerization of asymmetrical dichloroethylene with both methyl methacrylate and vinyl acetate, interpolymers having markedly better toughness and stability than either of the two component interpolymers are obtained.

Similarly, interpolymers of asymmetrical dichloroethylene and either methacrylonitrile or methyl vinyl ketone, although fairly satisfactory with respect to toughness and softening dependents, have undesirable solubility characteristics or poor resistance to common chemical reagents. By the interpolymerization of a mixture of asymmetrical dichloroethylene with either methacrylonitrile or methyl vinyl ketone, and styrene or methyl methacrylate, an interpolymer of greatly improved solubility and general durability is obtained without sacrificing toughness or depressing the softening points.

As many apparently widely different embodiments of this invention may be made without departing from the spirit and scope thereof, it is to be understood that the invention is not limited to the specific embodiments thereof except as defined in the appended claims.

I claim:

1. An interpolymer obtained by polymerizing a mixture of 10–90% of asymmetrical dichloroethylene, 5–50% of a polymerizable component from the group consisting of methyl, ethyl, phenyl, cyclohexyl, and p-cyclohexyl phenyl methacrylates, styrene, acrylonitrile, methacrylonitrile, methacrylic acid, methacrylic amide, methacrylic anilide, and phenyl vinyl ketone, and 5–30% of a polymerizable component from the group consisting of the vinyl esters of lower aliphatic acids, the esters of acrylic acid, the higher open-chain aliphatic monohydric alcohol esters of methacrylic acid, and methyl vinyl ketone, the proportions being selected to total 100%.

2. An interpolymer obtained by polymerizing a mixture of 20–80% of asymmetrical dichloroethylene, 10–40% of a polymerizable component from the group consisting of methyl, ethyl, phenyl, cyclohexyl, and p-cyclohexylphenyl methacrylates, styrene, acrylonitrile, methacrylonitrile, methacrylic acid, methacrylic amide, methacrylic anilide, and phenyl vinyl ketone, and 10–25% of a polymerizable component from the group consisting of the vinyl esters of lower aliphatic acids, the esters of acrylic acid, the higher open-chain aliphatic monohydric alcohol esters of methacrylic acid, and methyl vinyl ketone, the proportions being selected to total 100%.

3. An interpolymer obtained by polymerizing a mixture of 20–80% of asymmetrical dichloroethylene, 10–40% of methyl methacrylate, and 10–25% of a polymerizable component from the group consisting of the vinyl esters of lower aliphatic acids, the esters of acrylic acid, the higher open-chain aliphatic monohydric alcohol esters of methacrylic acid, and methyl vinyl ketone, the proportions being selected to total 100%.

4. An interpolymer obtained by polymerizing a mixture of 20–80% of asymmetrical dichloroethylene, 10–40% of methyl methacrylate, and 10–25% of vinyl acetate, the proportions being selected to total 100%.

5. An interpolymer obtained by polymerizing a mixture of 20–80% of asymmetrical dichloroethylene, 10–40% of methyl methacrylate, and 10–25% of methyl acrylate, the proportions being selected to total 100%.

6. Process of preparing an interpolymer which comprises dispersing a mixture of 10–90% of asymmetrical dichloroethylene, 5–50% of a polymerizable component from the group consisting of methyl, ethyl, phenyl, cyclohexyl, and p-cyclohexylphenyl methacrylates, styrene, acrylonitrile, methacrylonitrile, methacrylic acid, methacrylic amide, methacrylic anilide, and phenyl vinyl ketone, and 5–30% of a polymerizable component from the group consisting of the vinyl esters of lower aliphatic acids, the esters of acrylic acid, the higher open-chain aliphatic monohydric alcohol esters of methacrylic acid, and methyl vinyl ketone, the proportions being selected to total 100%, in an aqueous vehicle and subjecting same to an elevated temperature in the presence of an oxygen yielding polymerization catalyst.

7. An interpolymer obtained by polymerizing a mixture of 20–80% of asymmetrical dichloroethylene, 10–40% of methyl methacrylate, and 10–25% of isobutyl methacrylate, the proportions being selected to total 100%.

HAROLD W. ARNOLD.

CERTIFICATE OF CORRECTION.

Patent No. 2,278,415.  April 7, 1942.

HAROLD W. ARNOLD.

It is hereby certified that error appears in the printed specification of the above numbered patent requiring correction as follows: Page 2, first column, line 62, for "graviy" read --gravity--; line 69, after "55.4%" insert --asymmetrical--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.